Oct. 12, 1948.  R. F. MALLINA  2,450,974
METHOD OF MAKING MULTIPLE CABLES FOR TERMINAL BANKS
Filed June 19, 1942  3 Sheets-Sheet 1
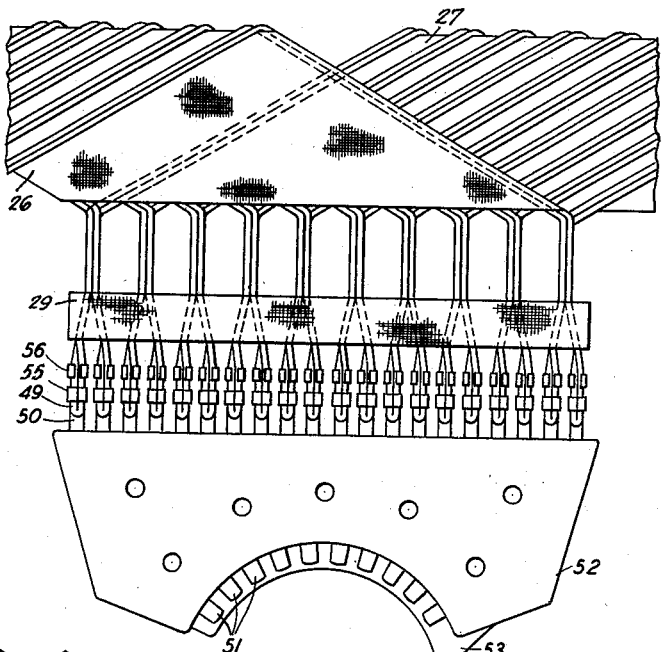
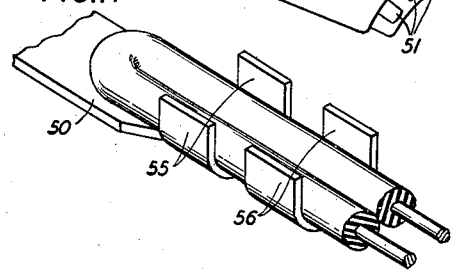
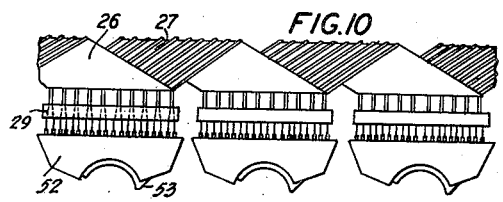
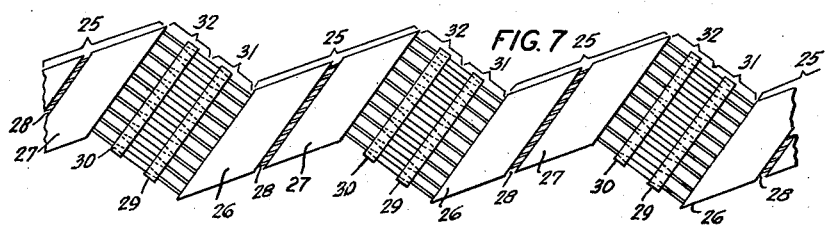
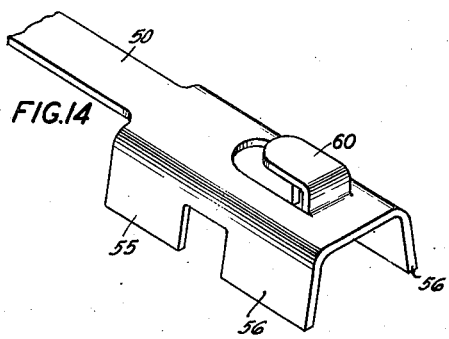
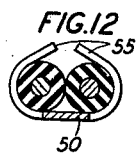
INVENTOR
R. F. MALLINA
BY
ATTORNEY Oct. 12, 1948.  R. F. MALLINA  2,450,974
METHOD OF MAKING MULTIPLE CABLES FOR TERMINAL BANKS
Filed June 19, 1942  3 Sheets-Sheet 2
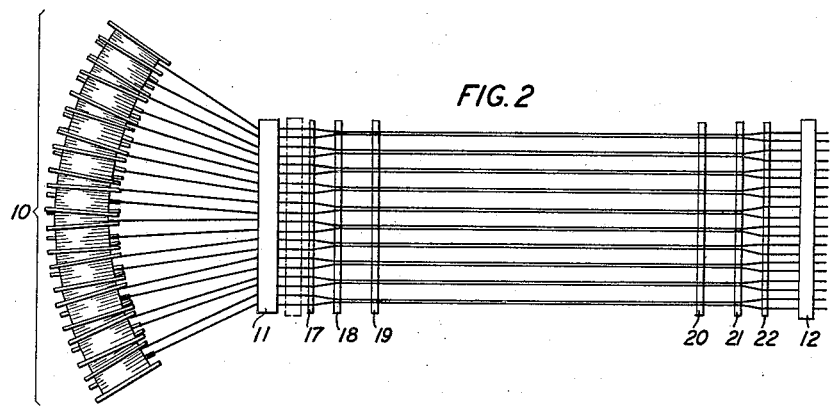
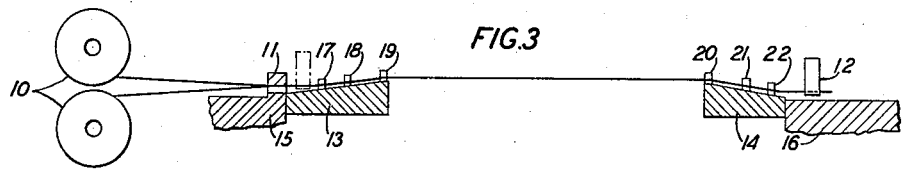
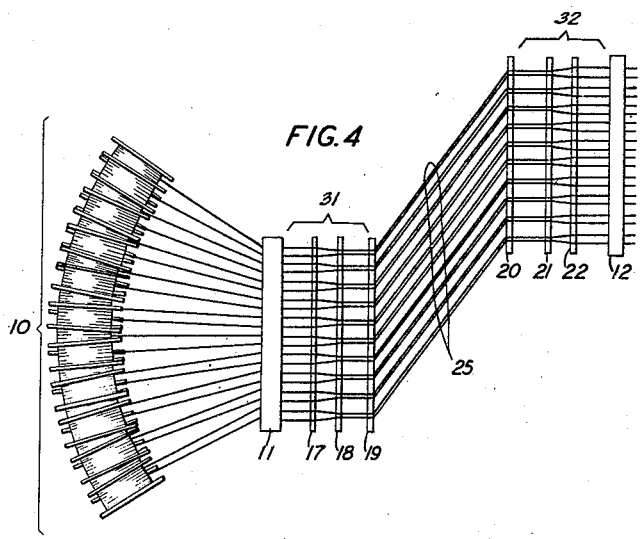
INVENTOR
R. F. MALLINA
BY
ATTORNEY

INVENTOR
R. F. MALLINA
ATTORNEY

Patented Oct. 12, 1948

2,450,974

UNITED STATES PATENT OFFICE 2,450,974

METHOD OF MAKING MULTIPLE CABLES FOR TERMINAL BANKS

Rudolph F. Mallina, Hastings on Hudson, N. Y., assignor to Bell Telephone Laboratories, Incorporated, New York, N. Y., a corporation of New York Application June 19, 1942, Serial No. 447,729

17 Claims. (Cl. 29—155.5)

This invention relates to switching devices and particularly to terminal banks and multiple cables for extending connections between such terminal banks used in switching devices.

An object is to simplify the method of fabricating and assembling multiple cables and terminal banks.

Heretofore various methods have been used for extending connections between terminals of succeeding terminal banks, for example, one consisted in prefabricating a cable in the form of a flat ribbon by weaving, the conductors serving as the woof and insulation strands serving as the warp. Openings were provided at intervals to expose the conductors for connection to the terminals. These cables were then placed at the rear of the terminals of a plurality of terminal banks and the exposed portion of the conductors were then soldered or otherwise connected to the individual corresponding terminals in succeeding terminal banks.

The present invention relates to methods of manufacturing series of terminal banks in which the terminals of corresponding levels or layers of terminals in the succeeding terminal banks are multipled together with cables or groups of conducting wires.

A feature thereof is the method which consists in securing a plurality of terminals to each of a plurality of insulating cards, connecting corresponding terminals in a series of cards to continuous conducting wires at spaced intervals, cutting these wires in sections each containing a predetermined number of cards and assembling said sections of cards into a series of interconnected terminal banks. This method may be carried out by first securing the terminals to a plurality of insulation cards and then fabricating a multiple cable of conducting wires which would consist in forming a flat layer of equally spaced wires in succeeding alternate rectangular and rhomboidally-shaped sections, securing fabric covering to the rhomdoidally-shaped sections and strips of fabrics covering to the rectangular section, folding the rectangular section in one direction and the rhomboidally-shaped section in the opposite direction so that the folded rectangular sections are formed in succeeding flat groups of loops of wires in a straight line for the connection thereof to terminals on a separate succeeding card. This cable is then placed with each group of loops to register with the terminals on a separate succeeding card and so that each loop is located between two pairs of tabs projecting from the associated terminal. These tabs on each terminal are then folded over the loop and some of them spot-welded to the loop through the insulation thereof. The terminals on a series of cards are now therefore connected at intervals to a continuous cable of conducting wires. This cable may then be cut into sections, each containing a predetermined group of cards and these groups of cards assembled one on top of the other to form a corresponding series of terminal banks in which corresponding levels or layers of terminals in the succeeding terminal banks are interconnected with corresponding cable sections.

The invention has been illustrated in the accompanying drawings in which:

Fig. 1 shows a completed terminal bank and a portion of a cable prefabricated in accordance with the applicant's invention connected thereto;

Figs. 2 to 9 illustrate the various steps taken in fabricating a cable ribbon in accordance with the applicant's invention;

Fig. 10 shows a plurality of terminal banks connected to a cable in accordance with the applicant's invention; and Figs. 11 to 13 show various views of a terminal tip and a loop of a conductor connected to the terminal; and Fig. 14 shows a modified form of a terminal tip.

Figure 5:
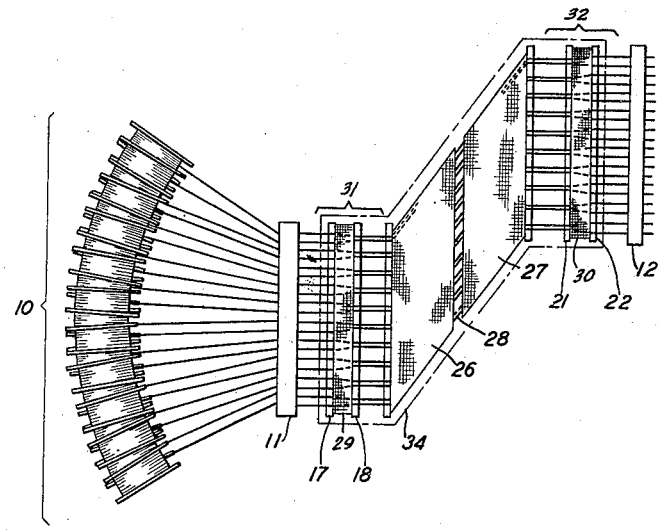
Figure 6:
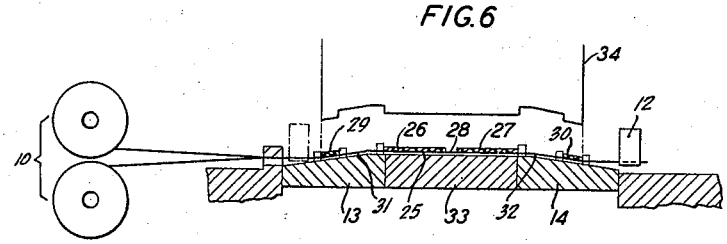

Referring now particularly to Figs. 1 to 10, the method of manufacturing ribbon cables may be as follows: For example, a cable of twenty insulated wires may be made and arranged for use in connecting two layers of ten terminals each in succeeding terminal banks as shown in Fig. 10. That is, one layer representing the tip terminals and the other layer representing the ring terminals as illustrated in Fig. 1. In this case twenty spools of wires may be placed as shown in Fig. 2 at 10 with ten spools in a semicircular row above another group of ten spools in the same semicircular row. From these twenty spools the wires are passed through evenly spaced holes in a stationary die member 11 to evenly space the twenty wires in a single flat row. At the right of die 11 a member 12, that may be designated as a gripper, may be arranged to grip the twenty wires and then passed towards the right to pull the twenty wires across to the position where this gripper 12 is shown. This distance represents the length of ribbon cable required between two adjacent terminal banks. After the wires have been pulled this distance, combs such as 13 and 14 may be raised between the points 15 and 16 as shown in Fig. 3. These combs may each have three rows of teeth such as 17, 18 and 19 on comb 13 and 20, 21 and 22 on comb 14. The rows of teeth 17 and 22 may be shaped so as to hold the wires in the position in which they were pulled out from the die 11, while the rows of teeth 18, 19, 20 and 21 may be so shaped as to arrange the twenty wires in ten pairs, as shown. The comb 14 and gripper 12 may then be shifted diagonally to one side of comb 13 keeping the wires between the rows of teeth 19 and 20 tight so as to bend the wires between these two rows into a rhomboidally-shaped field or section as shown in Fig. 4 at 25. Then, as shown in Fig. 5, two rhomboidally-shaped fabric pieces 26 and 27 may be placed over the rhomboidal wire section 25 with an opening between them as shown at 28, and a rectangular fabric piece 29 may be placed between the rows of teeth 17 and 18 and another rectangular fabric piece 30 between the rows of teeth 21 and 22 on the corresponding rectangular wire sections 31 and 32, respectively. Then as shown in Fig. 6 a supporting insert member 33 may be placed between the combs 13 and 14 and a heating unit 34 brought down over the four fabric pieces 29, 26, 27 and 30 to press them against the wires so that they will adhere thereto. The fabric pieces may be coated for this purpose with a suitable adhesive that when heated melts sufficiently to cause the fabric pieces to adhere to the wires. After these operations the combs 13 and 14 and the insert 33 may be removed and the gripper 12 shifted to the position near the die 11 it formerly occupied to grip the wires and then again moved towards the right to pull an additional section of wires out from the die 11. Thus additional cable sections may be formed up to the point as shown in Fig. 6 and these operations may be repeated as long as desired to form a ribbon cable as shown in Fig. 7.

Figure 8:
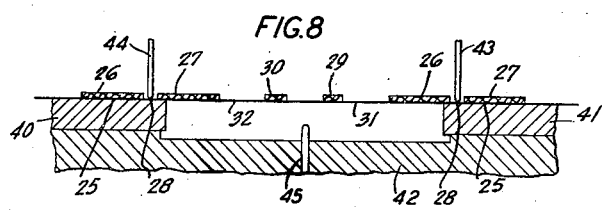
Figure 9:
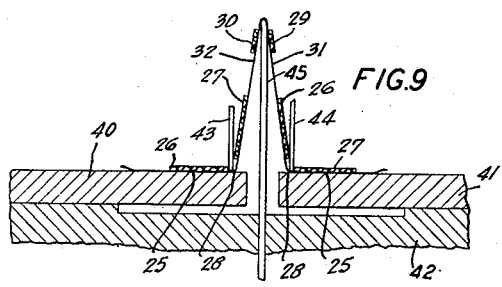

Then after a suitable number of these sections have been formed additional folding opperations will take place. This may be done as shown in Figs. 8 and 9. In this case a portion of the ribbon cable consisting of a fabric piece 27 of one rhomboidal wire section 25, a pair of adjacent rectangular wire sections 32 and 31 with their respective fabric pieces 30 and 29 and a fabric piece 26 of another rhomboidal wire section 25 will be placed as shown in Fig. 8. When a portion of the cable comprising these four parts is placed in this manner over the members 40 and 41 which rest on the plate 42, perpendicular bars such as 43 and 44 are placed as shown in Fig. 8 outside the two frabric pieces 27 and 26 respectively and centrally in the spaces 28 between these fabric pieces and their companion fabric pieces 26 and 27, and a similar bar 45 protruding through plate 42 is placed centrally between the rectangular wire sections 32 and 31 and their associated fabric pieces 30 and 29. Then the bar 45 is moved up through plate 42 and members 40 and 41 with bars 43 and 44 are moved towards each other. This will bend the wires exactly in the center between the rectangular wire sections 32 and 31 in one direction as the wires are pushed upwardly to the position shown in Fig. 9, and the wires will also be bent in the opposite direction by bars 43 and 44 at spaces 28 of the opposite wired sections 25. Therefore when the ribbon cable is bent in this manner from section to section, the folds produced by the bars 43 and 44 are diagonally across the wires while the fold between the rectangular section 31 and 32 are perpendicular or at right-angles to the wires. Then the succeeding sections are bent further or pressed down so that a folded flat cable ribbon is produced as is disclosed in Fig. 10, that is, each wire section 35 has its adjacent rhomboidal fabric pieces 26 and 27 folded against each other, while each pair of adjacent rectangular wire sections 31 and 32 are folded one above the other to form succeeding groups of wire loops extending in a straight line as shown particularly in Figs. 1 and 10 with each group containing twenty such loops. This flat folded ribbon cable is then ready for connection to terminals of succeeding switching banks. If the cable ribbon is considered as a whole, the method of folding may be restated in a somewhat simpler manner as outlined in the statement of invention, namely, if the section 25 covered by a pair of adjacent fabric pieces is considered as a single rhomboidal section and each intermediate pair of rectangular sections 31 and 32 is considered as a single rectangular section, then the folding of the rectangular sections may be considered as taking place in the center in one direction and the folding of the rhomboidal sections as taking place in the center in the opposite direction.

With the ribbon cable flattened out in this manner the next step will be to attach it to the layers of terminals in succeeding terminal banks. To accomplish this the loop ends such as 49 are twisted 90 degrees so that the loops will lie flat in a straight line alongside of each other as is clearly shown in Fig. 1. The individual groups of terminals may consist of two adjacent insulated layers of ten terminals each but with the twenty terminal ends spread out in a single group with these terminal ends such as 50 forming a straight line. These groups of two layers each of terminals may be formed to terminate in an arc as shown at 51 for the establishment of connections therewith by rotating brushes. The two layers of terminals may be held or secured between insulation plates or cards such as 52, 53 and another card not shown which are riveted or otherwise connected together. As shown in Fig. 11, these terminal ends terminate at 50 in two pairs of opposite upright tabs, one pair marked 55 and the other marked 56. If now a group of twenty loops 49 are placed with a loop between the tabs of the corresponding twenty terminals in said group, a suitable tool is applied to fold the tabs over the wire loops as shown in Fig. 12 and one pair on each terminal, for example, the pair 55 may be electrically welded to the loop of the wire by burning through the insulation and the welding tools may be arranged so as to slightly flatten out the conductor between the tabs 55 and the back of the terminal as is shown in Fig. 13. The purpose of the two sets of tabs is so that in the case of any movements of the ribbon cable in relation to the terminals take place during the handling of these sections, the welded connections will be protected from such disturbances as the pair of tabs 56 will maintain the loops in their proper relation to the terminals. In Fig. 14 another form of terminal is shown with the four tabs 55 and 56 and in addition there is provided on the back of the terminal a cut-out or raised tab 60. This tab 60 may be used in case some special connection is desired besides the cable connection in which case a wire is looped around the tab 60 and soldered or welded thereto.

Sections of this ribbon cable may now be cut off, each containing a predetermined number of groups of terminals assembled on insulation cards as shown, for example, in Fig. 10. These sections are then assembled and placed on top of each other and secured together to form succeeding individual complete terminal banks multipled together by said sections of ribbon cable. As is usual in telephone practice banks of this sort may be used for switching by movement of brushes to be shifted vertically to select levels of terminals and then horizontally in a rotary movement over a selected level to find the desired terminals. This makes for an easy assembly of terminal banks but there is also another advantage in the manufacturing of a multiple cable and terminal groups as shown in Fig. 10 as such an assembly may readily be moved and stored for use later in the manufacture of complete terminal banks, for example, ribbon cables of considerable length may be manufactured and later cut off into smaller sections for assembling in desired groups of terminal banks. As this flat ribbon cable does not occupy much space in a vertical direction, there is sufficient room between the different layers to prevent any interference of one cable with another in the assembled banks.

What is claimed is:

1. The method of fabricating a ribbon cable of wires by forming a flat layer of equally spaced wires in succeeding alternate rectangular and rhomboidally-shaped sections, securing a fabric covering to the rhomboidally-shaped sections and strips of fabric to the rectangular sections, folding the rectangular sections in one direction and the rhomboidally-shaped sections in another direction so that the folded rectangular sections form succeeding flat groups of loops of wires in a straight line.

2. The method of fabricating a ribbon cable of a group of insulated wires by forming a flat layer of wires in succeeding alternate rectangular and rhomboidally-shaped sections, securing two equal rhomboidally-shaped fabric sections adjacent to each other to each rhomboidally-shaped section of the layer of wire, securing two equal rectangular fabric sections adjacent each other to each rectangular section of the layer of wire, folding each rectangular section between the two fabric sections secured thereto, folding each rhomboidally-shaped section between the two fabric sections secured thereto in the opposite direction so that the folded rectangular sections form succeeding flat groups of loops of wires in a straight line for the connection of a terminal to each loop.

3. The method of manufacturing a wire ribbon cable consisting of forming a plurality of wires into a horizontally located flat ribbon section with the wires parallel and an equal distance apart, shifting said section in the horizontal plane to bend at two places to form three sections with the end sections rectangular and parallel and the middle section rhomboidally-shaped, securing two rhomboidally-shaped pieces of fabric in tandem to the middle section and a rectangular piece of fabric across each end section and repeating these operations to form a continuous ribbon of said groups of three sections, folding said ribbon perpendicularly to the horizontal plane to form an inverted V to produce three adjacent bends with the middle fold or bend at the apex of the V and located between two adjacent rectangularly-shaped pieces of fabric and the other two folds or bends located on opposite sides of said rectangularly-shaped pieces with each bend between two adjacent rhomboidally-shaped fabric pieces, repeating these folding operations for succeeding sections of the ribbon and pressing the succeeding V sections together to form a flat vertically located folded ribbon.

4. The method of wiring a plurality of terminal banks arranged in a straight line and having the terminals protruding from the banks and terminating in a straight line, consisting of the preparing of a ribbon cable by forming a plurality of insulated wires into a horizontally located flat ribbon section with the wires parallel and equal distance apart, shifting said section in the horizontal plane to bend the wires at two parallel transverse lines to form three sections with the end sections rectangular and parallel and the middle section rhomboidally-shaped, covering said middle section with two rhomboidally-shaped pieces of fabric in tandem and securing said pieces to the wires, securing to each of the end sections a narrow transverse rectangularly-shaped strip of fabric and repeating these operations for succeeding sections of the wires, folding the ribbon thus produced perpendicular to the horizontal plane to form succeeding folds in the shape of connected inverted V's, the folds at the apex of the V's occurring centrally and transversely between two adjacent fabric strips and the folds at the points where the adjacent inverted V's connect occurring centrally and diagonally between two adjacent rhomboidally-shaped fabric pieces, pressing these inverted V folds together to form a vertically located continuous flat ribbon cable, placing this ribbon cable to register with groups of terminals so that each group of wire loops at the apex of the inverted V's register with a group of terminals of a succeeding terminal bank, each group of terminals corresponding in number to the number of wires in a group, placing each wire loop between two pairs of transverse tabs on a corresponding terminal, folding the tabs of each terminal over the associated wire loop and welding the tabs of one pair of each terminal to the associated wire loop and the intermediate portion of the terminal.

5. The method of interconnecting groups of terminals comprising fabricating a ribbon cable of a group of insulated wires by forming a flat layer of equally spaced wires in succeeding alternate rectangular and rhomboidally-shaped sections, securing a fabric covering to the rhomboidally-shaped sections and strips of fabric covering to the rectangular sections, folding the rectangular sections in one direction and the rhomboidally-shaped sections in another direction so that the folded rectangular sections form succeeding flat groups of loops of wire in straight lines, arranging a group of terminals each having a plurality of tabs projecting therefrom opposite each group of loops so that each loop is placed between the tabs on a corresponding terminal, folding said tabs over the loops and spot-welding certain of said tabs of each terminal to the loop through the insulation.

6. The method of making multiple connections for terminal banks comprising fabricating a ribbon cable of insulated wires by forming a flat layer of equally spaced wires in succeeding alternate rectangular and rhomboidally-shaped sections, securing a fabric covering to the rhomboidally-shaped sections and strips of fabric to the rectangular sections, folding the rectangular sections in one direction and the rhomboidally-shaped sections in another direction so that the folded rectangular sections form succeeding flat groups of loops in a straight line, arranging a group of terminals of a bank in which each terminal is provided with a plurality of pairs of tabs projecting therefrom opposite each group of loops so that each loop fits between each pair, folding the tabs of each pair towards each other over the associated loop and spot-welding one of the pairs of tabs on each terminal to the loop through the insulation.

7. The method of making multiple connections for terminal banks comprising fabricating a ribbon cable of insulated wires by forming a flat layer of equally spaced wires in succeeding alternate rectangular and rhomboidally-shaped sections, securing a fabric covering to the rhomboidally-shaped sections and strips of fabric to the rectangular sections, folding the rectangular sections in one direction and the rhomboidally-shaped sections in another direction so that the folded rectangular sections form succeeding flat groups of loops of wire in a straight line, arranging a group of terminals of a bank in which each terminal is provided with pairs of tabs projecting therefrom so that each loop fits between each pair; folding the tabs of each pair towards each other over the associated loop and spot-welding the terminals to the loops so that for each terminal and loop one side of the loop is welded through the insulation to one tab of a pair and to the intermediate portion of the terminal and the other side of the loop is welded through the insulation to the other tab of said pair and an intermediate portion of the terminal.

8. The method of manufacturing a series of terminal banks in which insulated groups of terminals in corresponding levels of succeeding terminal banks are connected by wires formed into ribbon cables comprising fabricating a ribbon cable of wires by forming a flat layer of equally spaced wires in succeeding alternate rectangular and rhomboidally-shaped sections, securing a fabric covering to the rhomboidally-shaped sections and strips of fabric to the rectangular sections folding the rectangular sections in one direction and the rhomboidally-shaped sections in another direction so that the folded rectangular sections form succeeding flat groups of loops of wires in a straight line, connecting succeeding flat groups of loops to succeeding insulated groups of terminals with one loop connected to each terminal, cutting the cable in sections, each section remaining flat and including a predetermined number of succeeding groups of terminals connected thereto and assembling these flat sections one on top of the other to form succeeding terminal banks, each bank containing a group of terminals from each section connected to a corresponding group in a succeeding terminal bank.

9. The method of manufacturing a series of terminal banks in which groups of terminals in corresponding levels of succeeding terminal banks are multipled together by wire cables comprising fabricating a wire cable, connecting succeeding groups of terminals at intervals to said cable, cutting said cable in sections each including a predetermined number of succeeding groups and assembling these sections one on top of the other to form succeeding interconnected terminal banks.

10. The method of manufacturing a series of terminal banks in which groups of terminals in corresponding levels of succeeding terminal banks are multipled together by ribbon cables comprising fabricating a ribbon cable of wires to form succeeding flat groups of loops of wires, connecting succeeding groups of wire loops to the terminals of succeeding groups, cutting the cable in sections, each including a number of succeeding groups of terminals, and assembling these sections one on top of the other to form succeeding interconnected terminal banks.

11. The method of manufacturing a series of interconnected terminal banks comprising forming insulated groups of terminals, fabricating a group of wires into a single cable, arranging said cable so that each wire therein will engage a corresponding terminal in a succeeding group of terminals with the groups of terminals located at predetermined equal distances apart, connecting said engaged wires and terminals, cutting said cable in sections each including a predetermined number of succeeding groups of terminals, and assembling said sections one on top of the other to form succeeding terminal banks.

12. The method of manufacturing a series of terminal banks comprising forming insulated groups of terminals, fabricating a wire cable, connecting succeeding groups of terminals to corresponding continuous wire conductors in said cable at intervals, cutting said cable in sections each including a number of succeeding groups of terminals, and assembling the sections one on top of the other to form succeeding terminal banks each containing a number of groups and terminals.

13. A method of making a series of interconnected terminal banks which comprises securing a plurality of terminals to each of a plurality of insulation cards, arranging said cards of terminals in pairs with the terminals of each pair arranged one above the other, fabricating a cable of conductive wires electrically connecting corresponding terminals on a series of pairs of cards to the wires of said cable at spaced intervals to form a continuous string of electrically interconnected pairs of cards, cutting the cable into sections containing a predetermined number of pairs of cards, and then assembling a number of said sections into a corresponding series of interconnected contact banks.

14. The method of manufacturing a ribbon cable of wires comprising forming said wires in succeeding alternate flat rectangularly and rhomboidally-shaped sections, securing two fabric pieces to one side of the wires of each rhomboidally-shaped section, securing two rectangular fabric pieces to the same side of the wire of each rectangularly-shaped section, folding the wires in each rectangularly-shaped section over themselves so that folded ends of the wires form loops arranged in a straight line and the two associated fabric pieces of each rectangular section are on the outside of the wire folds, folding the wires in each rhomboidally-shaped section over themselves at an angle so that said loops in succeeding rectangular sections form a straight line and the two fabric pieces of each rhomboidally-shaped section lie next to each other.

15. The method of manufacturing a wire ribbon cable comprising pulling a series of wires from a source into a horizontally located ribbon with the wires parallel, forming an intermediate section of said ribbon in the same plane into a rhomboidal shape, securing a pair of rhomboidally-shaped pieces of impregnated fabric to said intermediate section, securing a rectangularly-shaped piece of impregnated fabric on each side of said rhomboidally-shaped section, repeating said pulling, forming and fabric applying operations for succeeding lengths of the wires, bending the ribbon simultaneously in three places, one bend being located between a pair of adjacent rectangularly-shaped fabric pieces, the second bend being located between the pair of rhomboidally-shaped fabric pieces on one side of the first bend and the third bend being located between the pair of rhomboidally-shaped fabric pieces on the other side of said first bend, said last two bends being made in a direction opposite to the first bend, repeating these three bending operations for succeeding sections of the ribbon, said bending operations being such as to form a continuously folded ribbon with loops of wires between succeeding pairs of rectangularly-shaped fabric pieces lying in a straight line.

16. The method of fabricating a ribbon cable of a group of insulated wires comprising forming said wires in succeeding alternate rectangular and rhomboidally-shaped sections, securing a pair of narrow rectangular fabric strips to each rectangular section and a pair of rhomboidally-shaped fabric pieces to each rhomboidally-shaped section, folding the wires of each rectangular section back over themselves to form a sharp individual loop at the folded end of each wire with the two rectangular fabric strips registering with each other and located on the opposite sides of the folded wires and folding the wires of each rhomboidally-shaped section back over themselves at such an angle that all the loops of the wires at the end of the folded rectangular sections align themselves in a straight line and with the two rhomboidally-shaped fabric pieces facing each other.

17. The method of assembling terminal banks which comprises longitudinally advancing a plurality of insulation covered wires in a common plane, electrically connecting the corresponding terminals of successive individual groups each having the terminals thereof disposed in the same plane to selected wires at successive zones through the insulation of the wires, and finally assembling the groups in stacked banks.

RUDOLPH F. MALLINA.

REFERENCES CITED

The following references are of record in the file of this patent:

UNITED STATES PATENTS

| Number | Name | Date |
|---|---|---|
| 445,234 | Reilly | Jan. 27, 1891 |
| 1,104,061 | McBerty | July 21, 1914 |
| 1,298,330 | Goodrum | Mar. 25, 1919 |
| 1,697,222 | Bohme | Jan. 1, 1929 |
| 2,200,776 | Hoover | Dec. 8, 1937 |
| 2,206,325 | Lomox et al. | July 2, 1940 |
| 2,298,236 | Siegmund | Oct. 6, 1942 |
| 2,343,466 | Malhiot | Mar. 7, 1944 |

FOREIGN PATENTS

| Number | Country | Date |
|---|---|---|
| 222,032 | Great Britain | Sept. 10, 1926 |
| 249,404 | Great Britain | Mar. 25, 1926 |
| 433,598 | Germany | Sept. 10, 1926 |